US012656462B2

(12) United States Patent
Chung

(10) Patent No.: US 12,656,462 B2
(45) Date of Patent: Jun. 16, 2026

(54) LiDAR SYSTEM AND CROSSTALK REDUCTION METHOD THEREOF

(71) Applicant: Guangzhou Tyrafos Semiconductor Technologies Co., Ltd., Guangzhou (CN)

(72) Inventor: Jun-Wen Chung, Tainan (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 545 days.

(21) Appl. No.: 18/230,315

(22) Filed: Aug. 4, 2023

(65) Prior Publication Data

US 2024/0045032 A1 Feb. 8, 2024

Related U.S. Application Data

(60) Provisional application No. 63/395,347, filed on Aug. 5, 2022.

(30) Foreign Application Priority Data

May 8, 2023 (TW) ................................. 112117043

(51) Int. Cl.
| | |
|---|---|
| *G01S 7/481* | (2006.01) |
| *G01S 17/89* | (2020.01) |
| *G06T 7/11* | (2017.01) |
| G01S 17/931 | (2020.01) |

(52) U.S. Cl.
CPC ............ *G01S 7/4816* (2013.01); *G01S 17/89* (2013.01); *G06T 7/11* (2017.01); *G01S 17/931* (2020.01); *G06T 2207/20221* (2013.01); *G06T 2207/30261* (2013.01)

(58) Field of Classification Search
CPC ........ G01S 17/10; G01S 17/89; G01S 17/931; G01S 7/4816; G01S 7/4876; G01S 7/4813; G01S 7/4817; G01S 7/4865; G01S 17/42; G01S 7/4811; G01S 7/4814; G01S 7/484; G06T 2207/20221; G06T 2207/30261; G06T 7/11
USPC ....................................................... 356/5.01
See application file for complete search history.

(56) References Cited

U.S. PATENT DOCUMENTS

| | | | | |
|---|---|---|---|---|
| 10,061,019 | B1 * | 8/2018 | Campbell | ............... G01S 17/42 |
| 2016/0266347 | A1 * | 9/2016 | Shimoda | .................. G02B 7/40 |

* cited by examiner

*Primary Examiner* — Nathnael Aynalem

(57) ABSTRACT

A LiDAR system includes a microcontroller, a laser light source, a lens module, and a receiver. The lens module includes a laser beam splitter module and a receiver lens module, the laser beam splitter module receiving a laser light and diffracting the laser light into multiple diffractive lights emitted toward a target. The receiver lens module receives a reflective light signal of the diffractive lights reflected from the target and emits the reflective light signal towards the receiver. A frame of the LiDAR system includes a plurality of subframes. The microcontroller compares the average distance values at the same sampling area of each subframe within the frame, eliminates the subframes with abnormal average distance values, and fuses the other subframes with similar average distance values as a final distance value of the frame.

14 Claims, 14 Drawing Sheets

306c

306b

306a

304

302

15m  40m  100m  200m  300m

900

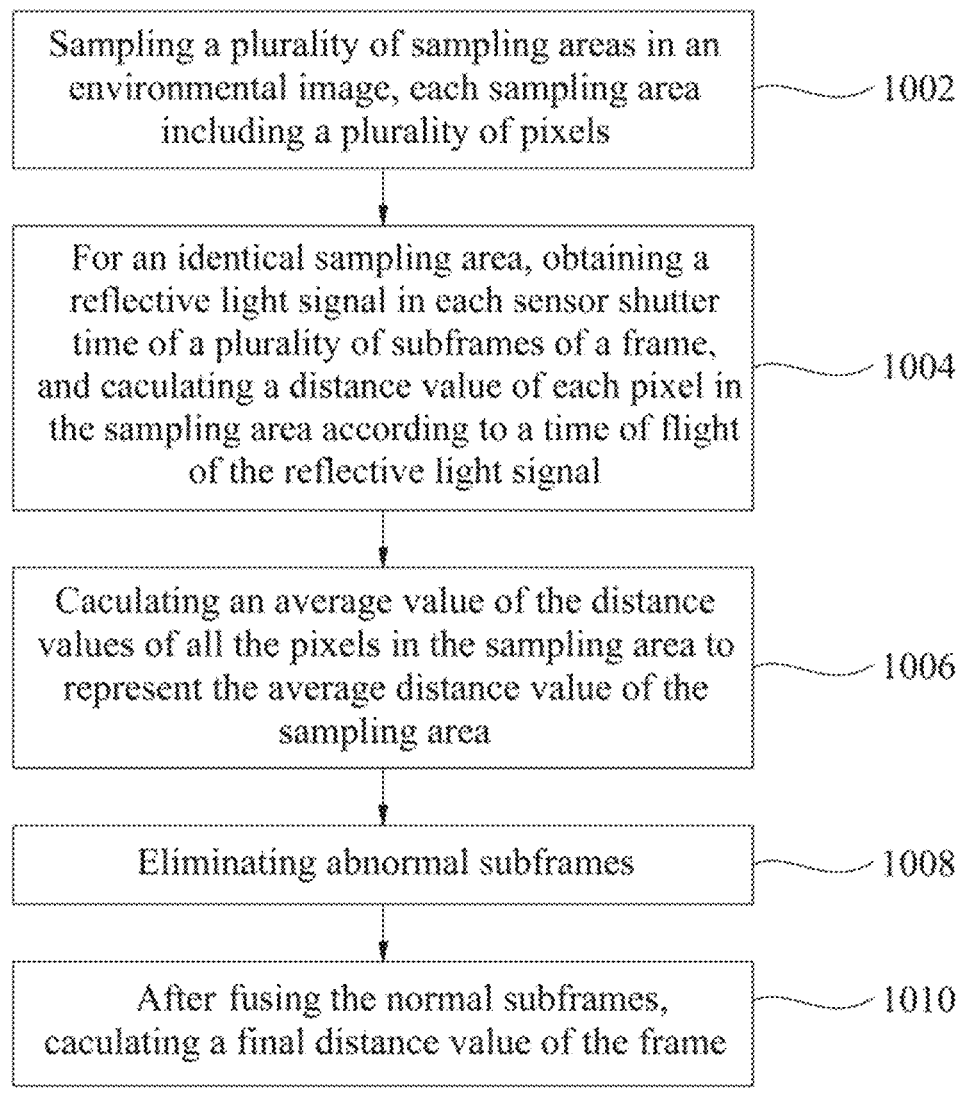

1000

Sampling a plurality of sampling areas in an environmental image, each sampling area including a plurality of pixels — 1002

For an identical sampling area, obtaining a reflective light signal in each sensor shutter time of a plurality of subframes of a frame, and caculating a distance value of each pixel in the sampling area according to a time of flight of the reflective light signal — 1004

Caculating an average value of the distance values of all the pixels in the sampling area to represent the average distance value of the sampling area — 1006

Eliminating abnormal subframes — 1008

After fusing the normal subframes, caculating a final distance value of the frame — 1010

FIG. 10B

LiDAR SYSTEM AND CROSSTALK REDUCTION METHOD THEREOF

CROSS-REFERENCE TO RELATED APPLICATION

This application claims the priorities of US provisional application No. 63/395,347, filed on Aug. 5, 2022; and Taiwanese patent application No. 112117043, filed on May 8, 2023, the content of which are incorporated herewith by reference.

BACKGROUND OF THE INVENTION

1. Field of the Invention

The present invention relates generally to a LiDAR system, and more particularly, to a LiDAR system with a crosstalk reduction function.

2. The Prior Arts

In recent years, light detection and ranging (LiDAR) technologies are widely applied in vehicle auto/semi-auto driving and safety alerts. The LiDAR mainly include a sensor (such as a direct time of flight (D-ToF) sensor), a laser light source, a scanner, and a data processor. The current LiDAR scanning methods include a variety of forms, such as projecting small-area light dots with an optical phased array (OPA) or diffractive optical element (DOE), scanning a large area in a zigzag shape or diagonal shape with a microelectromechanical system (MEMS) micro-galvanometer scanner or polygon mirror, or projecting linear light beams and horizontally scanning a large area through mechanical rotation with a DOE, multiple-point linear light source or multiple reflection and beam expansion, and so on. With the aforementioned scanning methods, the sensor may receive the reflected light signals.

However, the laser light source detection with the aforementioned methods has smaller screen ratio, so the receiving of the reflected light signals is required to be persistently performed in higher frequencies. If the sensor receives other light sources, such as crosstalk or ambient lights, the data processor may misjudge the distances, thereby affecting driving safety. As such, a LiDAR system which may effectively filter and eliminate the crosstalk and ambient lights in the received light signals to correctly determine the distances is desired to be provided to ensure driving safety. A crosstalk reduction method is desired to be provided as well to allow a LiDAR system to effectively filter and eliminate the crosstalk and ambient lights in the received light signals to correctly determine the distances and ensure driving safety.

SUMMARY OF THE INVENTION

A primary objective of the present invention is to provide a LiDAR system which may effectively filter and eliminate the crosstalk and ambient lights in the received light signals to correctly determine the distances and ensure driving safety.

For achieving the foregoing objectives, the present invention provides a LiDAR system. The LiDAR system includes a microcontroller, a laser light source coupled to the microcontroller, a lens module, and a receiver coupled to the microcontroller. The lens module includes a laser beam splitter module and a receiver lens module, the laser beam splitter module receiving a laser light emitted from the laser light source and diffracting the laser light into a plurality of diffractive lights, the diffractive lights being emitted towards a target. The receiver lens module receives a reflective light signal of the diffractive lights reflected from the target and emits the reflective light signal towards the receiver. The laser light source emits a pulse signal with a cycle time. The microcontroller controls the receiver to turn on during a sensor shutter time and turn off during a reset time in each cycle time. A frame of the LiDAR system includes a plurality of subframes, each subframe obtaining images within each cycle time respectively. In an environmental image including a plurality of sampling areas of each subframe, each sampling area includes a plurality of pixels, a distance value of each reflective light signal at each pixel being obtained according to a time of flight. The microcontroller calculates an average distance value of the distance values of the plurality of pixels, which represents the average distance value of the sampling area. The microcontroller compares the average distance values at the same sampling area of each subframe within the frame, eliminates the subframes with abnormal average distance values, and fuses the other subframes with similar average distance values as a final distance value of the frame.

For achieving the foregoing objectives, the present invention provides a crosstalk reduction method of the LiDAR system. The method includes: sampling a plurality of sampling areas in an environmental image, each sampling area including a plurality of pixels; the number of pixels included in the sampling areas being no more than 10% of the number of pixels of the environmental image, and the number of the sampling areas being at least five; for the same sampling area, in each sensor shutter time of a plurality of subframes of a frame, obtaining a reflective light signal, and calculating a distance value for each pixel within the sampling area according to the time of flight of the reflective light signal; calculating an average value of all the distance values of the pixels within the sampling area, the average value representing an average distance value of the sampling area; among the subframes, eliminating the subframes having significantly distinct average distance values at identical positions of the plurality of sampling areas; and fusing the distance values in the environmental images of the uneliminated subframes as the final distance value of the frame.

Accordingly, the advantageous effect of the present invention is: by projecting a large area of light dots with a diffractive optical element, a large area of image may be obtained with one or several times of pulse scanning without scanning back and forth, thereby significantly increasing the frame rate and effectively reducing the effect of crosstalk.

BRIEF DESCRIPTION OF THE DRAWINGS

The present invention will be apparent to those skilled in the art by reading the following detailed description of a preferred embodiment thereof, with reference to the attached drawings, in which:

FIG. 10B is a flow chart of another crosstalk reduction method according to the present invention;

DETAILED DESCRIPTION OF THE PREFERRED EMBODIMENT

The accompanying drawings are included to provide a further understanding of the invention and are incorporated in and constitute a part of this specification. The drawings illustrate embodiments of the invention and, together with the description, serve to explain the principles of the invention.

The present invention provides a LiDAR system with a crosstalk reduction function and a crosstalk reduction method of the LiDAR system. By projecting a large area of light dots with a diffractive optical element (DOE), a large area of image may be obtained with one or several times of pulse scanning without the requirement of scanning back and forth, which significantly increases the frame rate and effectively reduces the effect of crosstalk.

Figure 1:
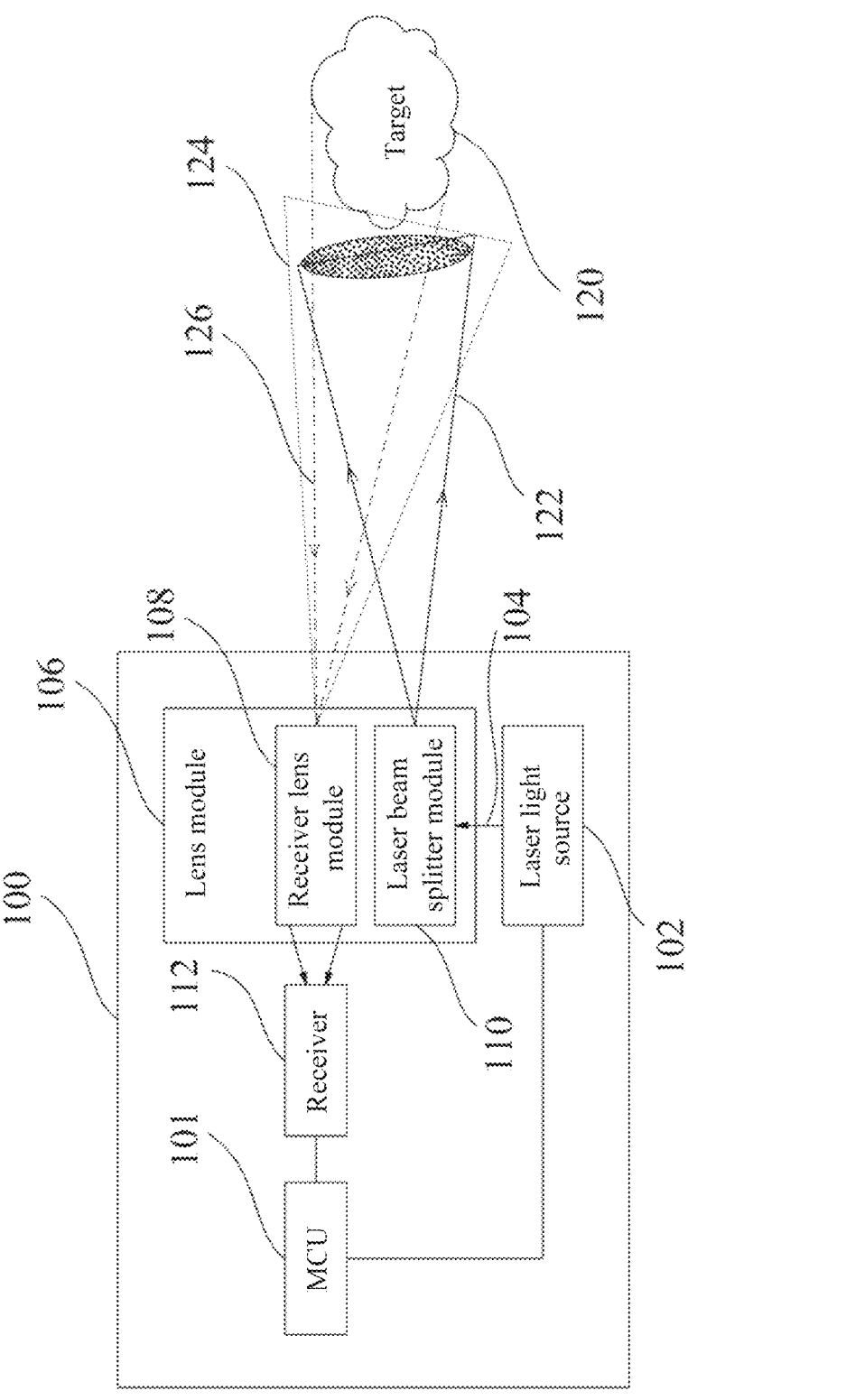
FIG. 1 is a schematic diagram illustrating the LiDAR system of the present invention.

Referring to FIG. 1, the present invention provides a LiDAR system 100, including a microcontroller unit (MCU) 101, a laser light source (TX) 102, a lens module 106 and a receiver (RX) 112. The lens module 106 includes a receiver lens module 108 and a laser beam splitter module 110. The laser light source 102 and the receiver 112 are coupled to the MCU 101.

To measure the distance between a target 120 and the LiDAR system 100, first, the MCU 101 controls the laser light source 102 to emit a laser light 104. Then, the laser beam splitter module 110 scatters the laser light 104 into a plurality of light dots, the light dots distribute within a field of image (FOI) 122, and the FOI 122 completely covers the target 120. Subsequently, after touching the target 120, the light dots are reflected as a plurality of reflective lights 126, the reflective lights 126 distributing within a field of view (FOV) 124. The receiver lens module 108 receives reflective lights 126 and sends reflective light signals to the receiver 112. The receiver 112 sends the received signals to the MCU 101 for subsequent image analyses.

Figure 2:
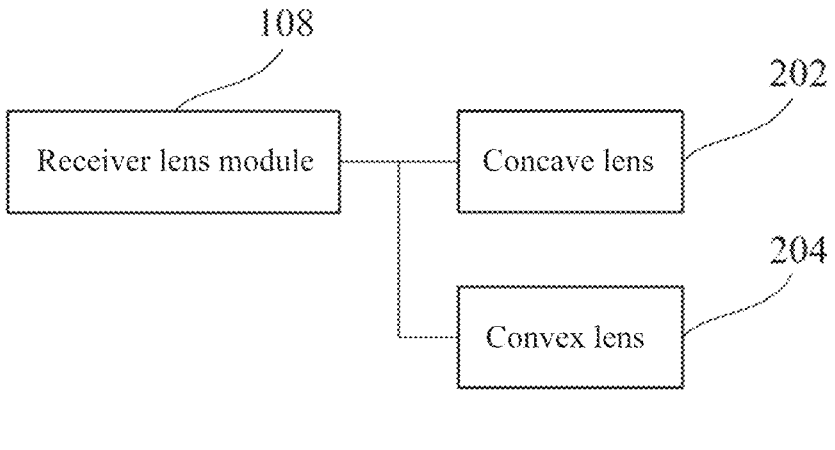
FIG. 2 is a schematic diagram of the interior structure of a part of elements shown in FIG. 1.
Figure 2:
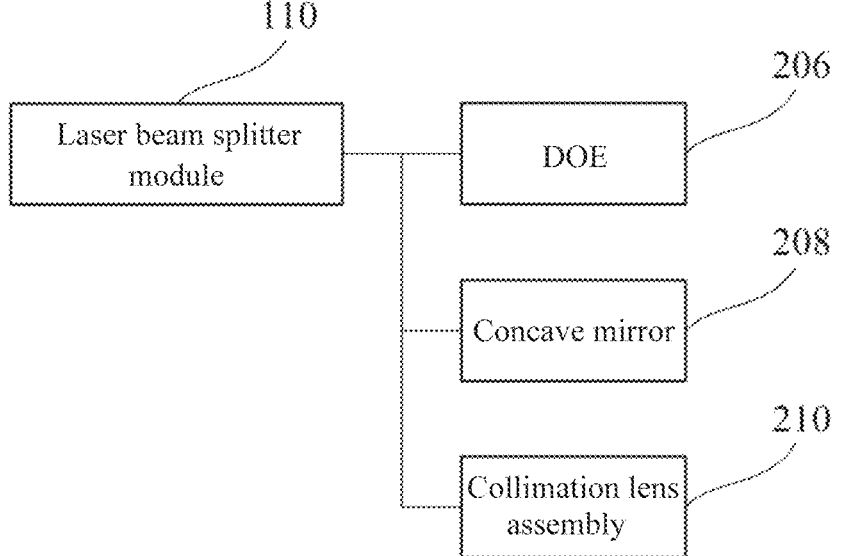

Referring to FIG. 2, the receiver lens module 108 in FIG. 1 includes a lens module comprising at least one concave lens 202 and at least one convex lens 204. The concave lens 202 and the convex lens 204 form a condensing lens module which may condense the reflective lights 126 in FIG. 1 to send light signals to the receiver 112. The laser beam splitter module 110 in FIG. 1 includes a diffractive optical element (DOE) 206, a concave mirror 208 and a collimation lens assembly 210. The operation of the laser beam splitter module 110 will be explained in detail below.

Figure 3:
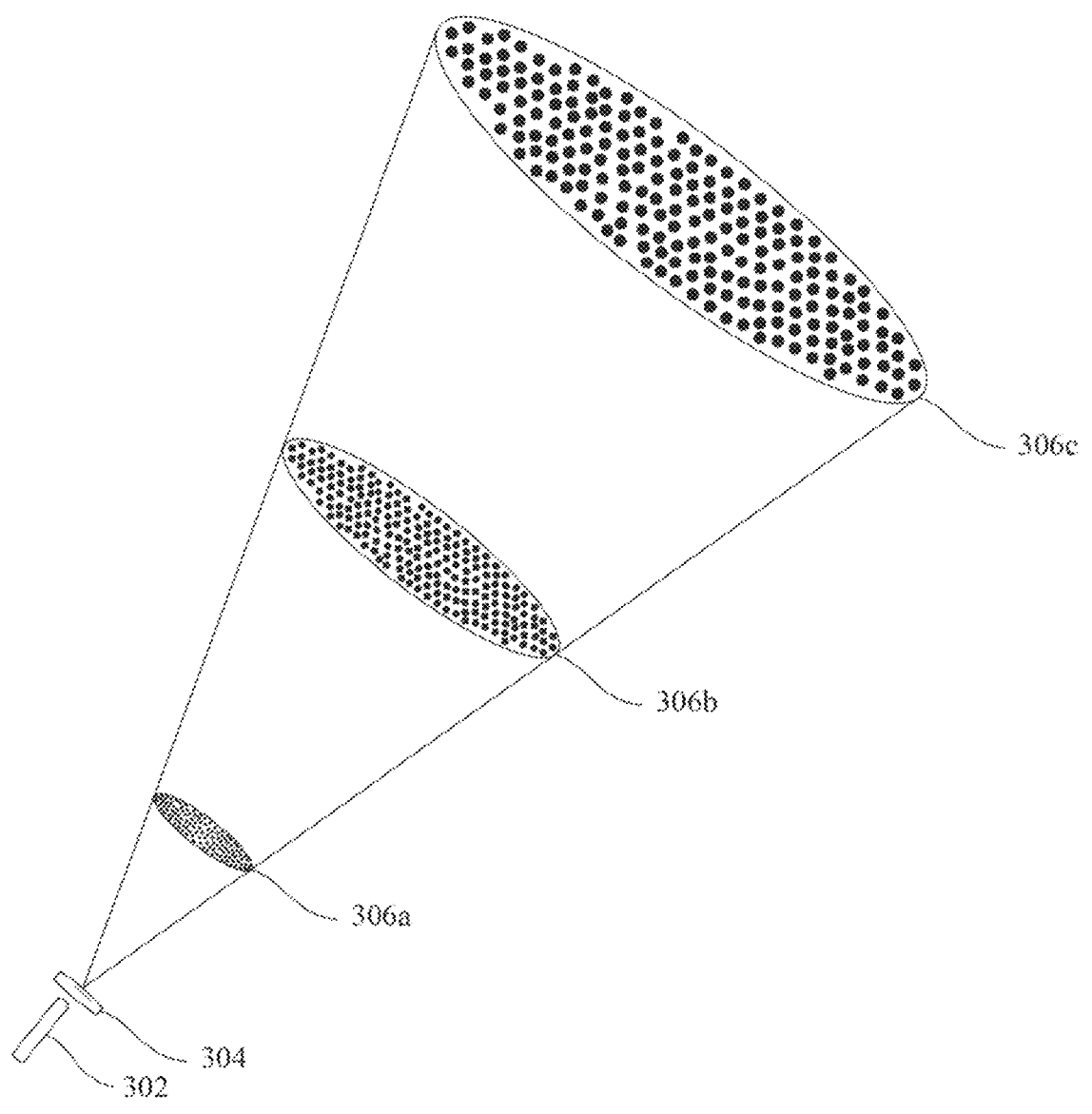
FIG. 3 shows an operation of a diffractive optical element.

Referring to FIG. 3, when a laser light 302 is emitted towards a DOE 304, the DOE 304 diffracts the laser light 302 into thousands to tens of thousands of light dots. The light dots form point clouds 306a, 306b and 306c at different distances, in which the point cloud 306a is the nearest to the DOE 304, the light dots are the most dense, and the covering area of the point cloud is the smallest; the point cloud 306c is the farthest to the DOE 304, the light dots are the least dense, and the covering area of the point cloud is the largest. The DOE 304 may be, for example, a HCPDOE™ of Guangzhou Tyrafos Semiconductor Technologies Co., Ltd., but the invention is not limited thereto.

Due to the point cloud covering areas shown in FIG. 3 being proportional to the square of distances, the point cloud covering area will rapidly expand when the distance is relatively long, causing the decrease of light energy per unit area and the insufficiency of reflective light intensity. However, significantly increasing the intensity of the laser light 302 may decrease the lifetime of equipment and is hazardous to human eyes. Thus, referring to FIG. 4, a lens module with an adjustable focal length comprising at least a concave lens 202 and at least a convex lens 204 may adjust the size of the FOV according to a detection range, so that the light energy per unit area is substantially equal at different distances (for example, 15 m, 40 m, 100 m, 200 m and 300 m) to prevent from the insufficiency of reflective light intensity at longer distances. Alternatively, a plurality of lens modules of fixed focal lengths, each of the lens modules including at least one concave lens 202 and at least one convex lens 204 with the lens modules being switched according to a detection range, may be used to modulate the size of the FOV.

Figure 4:
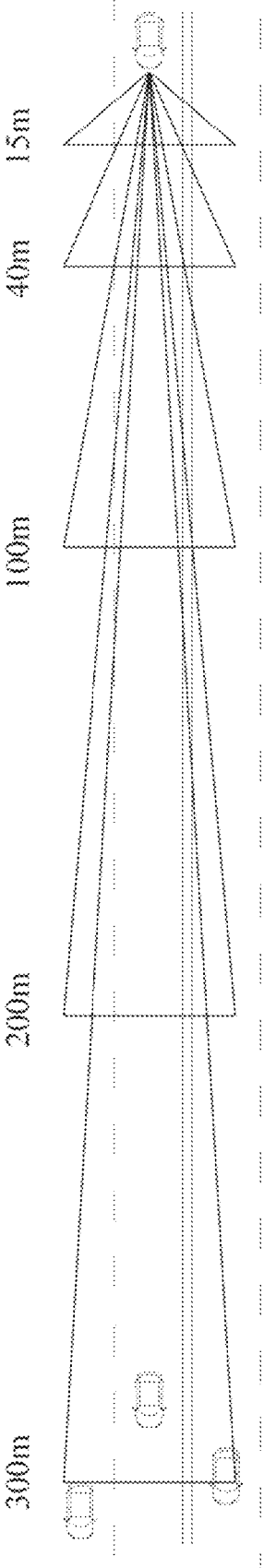
FIG. 4 shows an operation of the present invention at different distances.
Figure 5A:
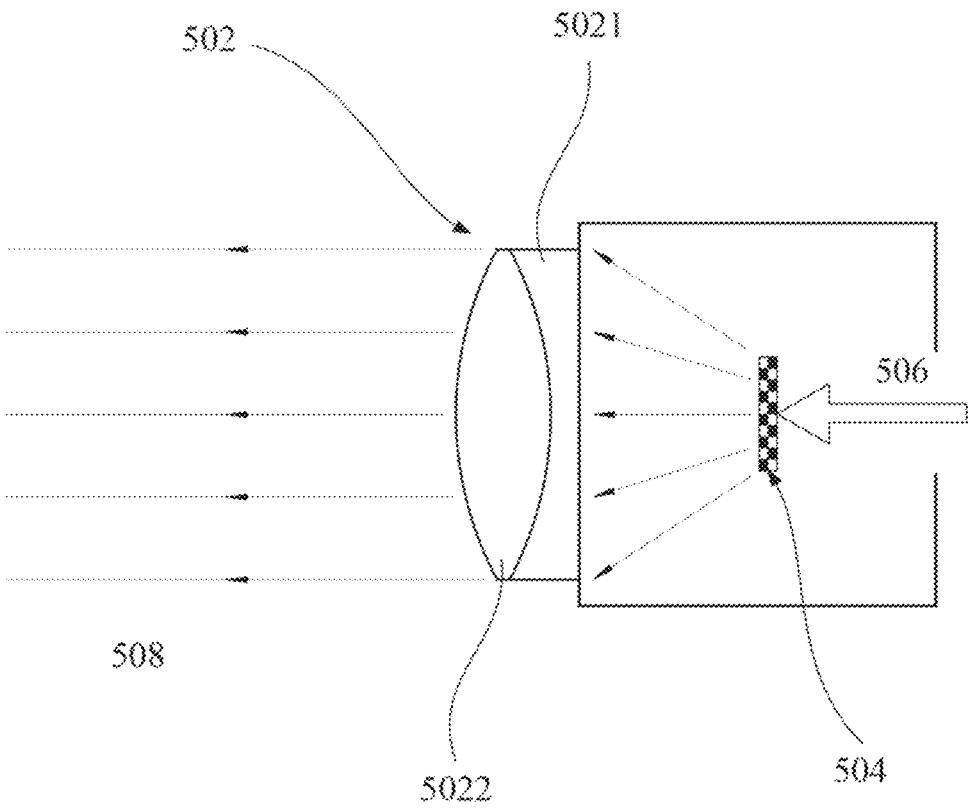
FIG. 5A is an arrangement of a collimation lens assembly according to the present invention.

A way to achieve the arrangement shown in FIG. 4 is using a collimation lens assembly to converge the covering area of diffractive lights within a range. By the modulation of focal lengths, the collimation lens assembly may modulate the divergence angle of the incident light and adjust the range of FOI of the projected light dots according to the detection range to achieve the effect shown in FIG. 4. A plurality of collimation lens assemblies with fixed focal lengths with the collimation lens assemblies being switched according to the detection range may be used to modulate the range of FOI. Alternatively, a collimation lens assembly with an adjustable focal length with the collimation lens assembly being switched according to the detection range may be used to modulate the range of FOI. Referring to FIG. 5A, an arrangement of collimation lens assembly is placing a collimation lens assembly 502 in front of a DOE 504, where the mirror surface of the collimation lens assembly 502 is perpendicular to the incident direction of a laser light 506. As shown in FIG. 5A, the collimation lens assembly 502 may converge diffractive lights 508 emitted from the DOE 504 to be substantially parallel to each other, so that the light energy per unit area of the diffractive lights 508 remains substantially equal at different distances. In an embodiment, the collimation lens assembly 502 includes a concave lens 5021 and a convex lens 5022, in which the distance between the concave lens 5021 and the convex lens 5022 is adjustable to control the divergence angle.

Figure 5B:
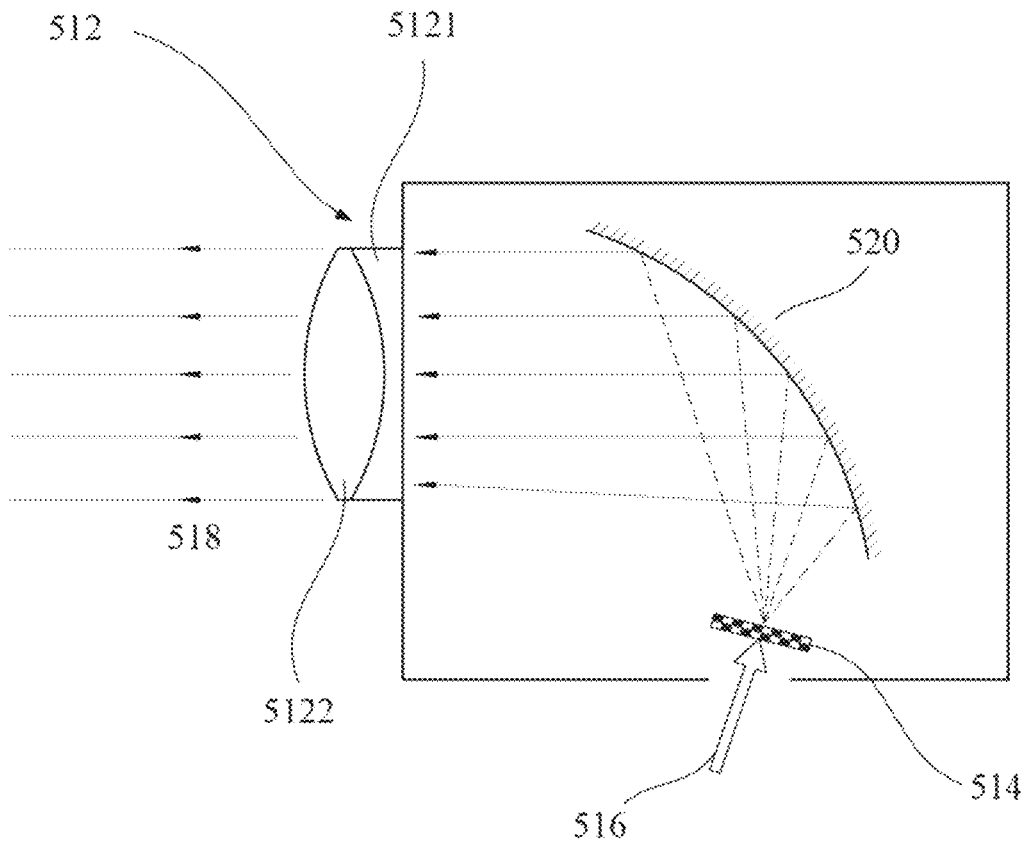
FIG. 5B is another arrangement of a collimation lens assembly according to the present invention.

Referring to FIG. 5B, another collimation lens assembly arrangement is placing a collimation lens assembly 512 in front of a concave mirror 520 and collecting the diffractive lights emitted from a DOE 514 with the concave lens 520. As shown in FIG. 5B, the DOE 514 diffracts a laser light 516 into a plurality of diffractive lights 518, the diffractive lights 518 being reflected and converged for the first time by the concave mirror 520 and emitted towards the collimation lens assembly 512. Subsequently, the collimation lens assembly 512 converges the diffractive lights 518 for the second time to be substantially parallel to each other, so that the light energy per unit area of the diffractive lights 518 remains substantially equal at different distances. In an embodiment, the collimation lens assembly 512 includes a concave lens 5121 and a convex lens 5122, in which the distance between the concave lens 5121 and the convex lens 5122 is adjustable to control the divergence angle. Compared with the arrangement shown in FIG. 5A, such an arrangement may collect diffractive lights within a greater angle, which increases the emitted light energy per unit area without increasing the intensity of the laser light.

In the practical situation of vehicle auto-driving, when a vehicle is moving, the crosstalk the LiDAR system 100 may receive includes the scanning laser of front vehicles at the opposite lane, the front-orientation pulse laser of front vehicles at the opposite lane, the scanning laser of front vehicles at the same direction lane, the rear-orientation pulse laser of front vehicles at the same direction lane, and so on. Thus, it is desired to eliminate the crosstalk to correctly measure distances and ensure driving safety.

Figure 6:
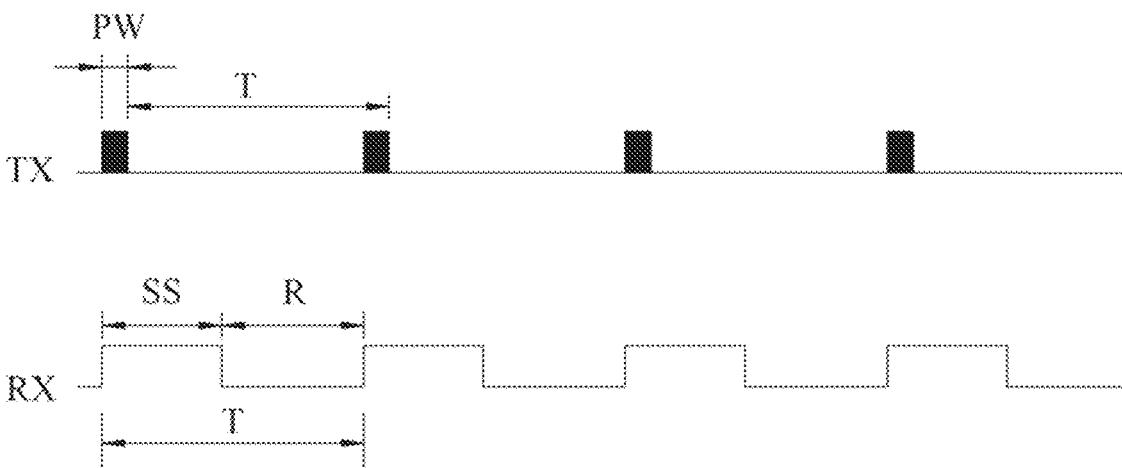
FIG. 6 is an exemplified timing diagram according to the present invention.

When the laser light source 102 in FIG. 1 emits a pulse signal, to eliminate crosstalk, the MCU 101 may turn on or off the receiver 112 according to the detection range, so that the receiver 112 receives only the reflective light signals within the detection range. For example, if the object to measure is 300 meters away, the required time from the laser light source 102 emitting a pulse signal to the receiver 112 receiving a reflective light signal is 2 μs (R=ct/2, where R is the distance, c is the speed of light $3 \times 10^8$ m/s, t is the time (sec)). Thus, in a cycle time, the receiver 112 and the laser light source 102 may be synchronously turned on with a sensing time 2 μs and turned off at the remaining time to prevent from receiving crosstalk. Referring to FIG. 6, the laser light source (TX) emits a pulse signal with pulse width PW in a cycle time T. The receiver (RX) is turned on during a sensor shutter time SS and turned off during a reset time R in the cycle time T, where T=SS+R. The sensor shutter time and the reset time R are determined according to the detection range. In an embodiment, when the detection range is 300 m, the sensor shutter time SS is 2 μs, the reset time R is 2 μs, the cycle time T is 4 μs, and the pulse width PW is 100 ns. In this case, the receiver (RX) may receive reflective light signals from 0 to 300 meters away, and the theoretical frame rate (the number of scanning) may be as high as $1/T=2.5 \times 10^5$ f/s.

Figure 7:
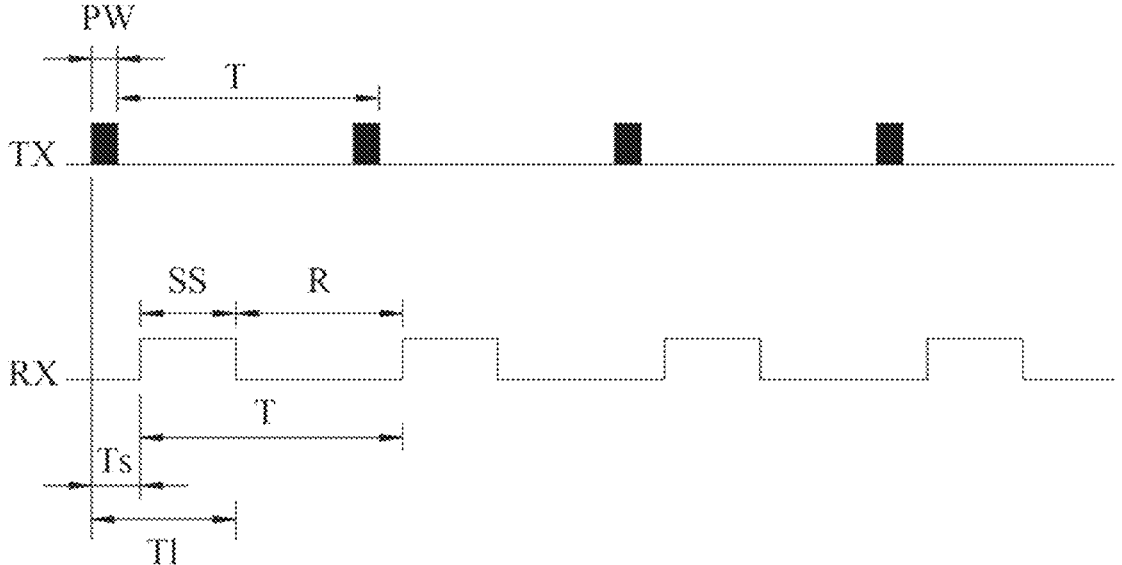
FIG. 7 is another exemplified timing diagram according to the present invention.

Referring to FIG. 7, in addition to the upper limit of the detection range, the lower limit of the detection range may be set to the receiver (RX) by adjusting the sensor shutter time SS. In FIG. 7, the start time Ts of the sensor shutter time SS is determined according to the lower limit of the detection range, and the end time T1 of the sensor shutter time SS is determined according to the upper limit of the detection range. In an embodiment, when the detection is from 90 to 300 meters, the start time Ts is 600 ns, the end time T1 is 2 μs, the sensor shutter time SS is 1400 ns, the reset time R is 2 μs, the cycle time T is 4 μs, and the pulse width PW is 100 ns. In this case, the receiver (RX) may receive reflective light signals from 90 to 300 meters away, and the theoretical frame rate is $1/T=2.5 \times 10^5$ f/s.

Figure 8:
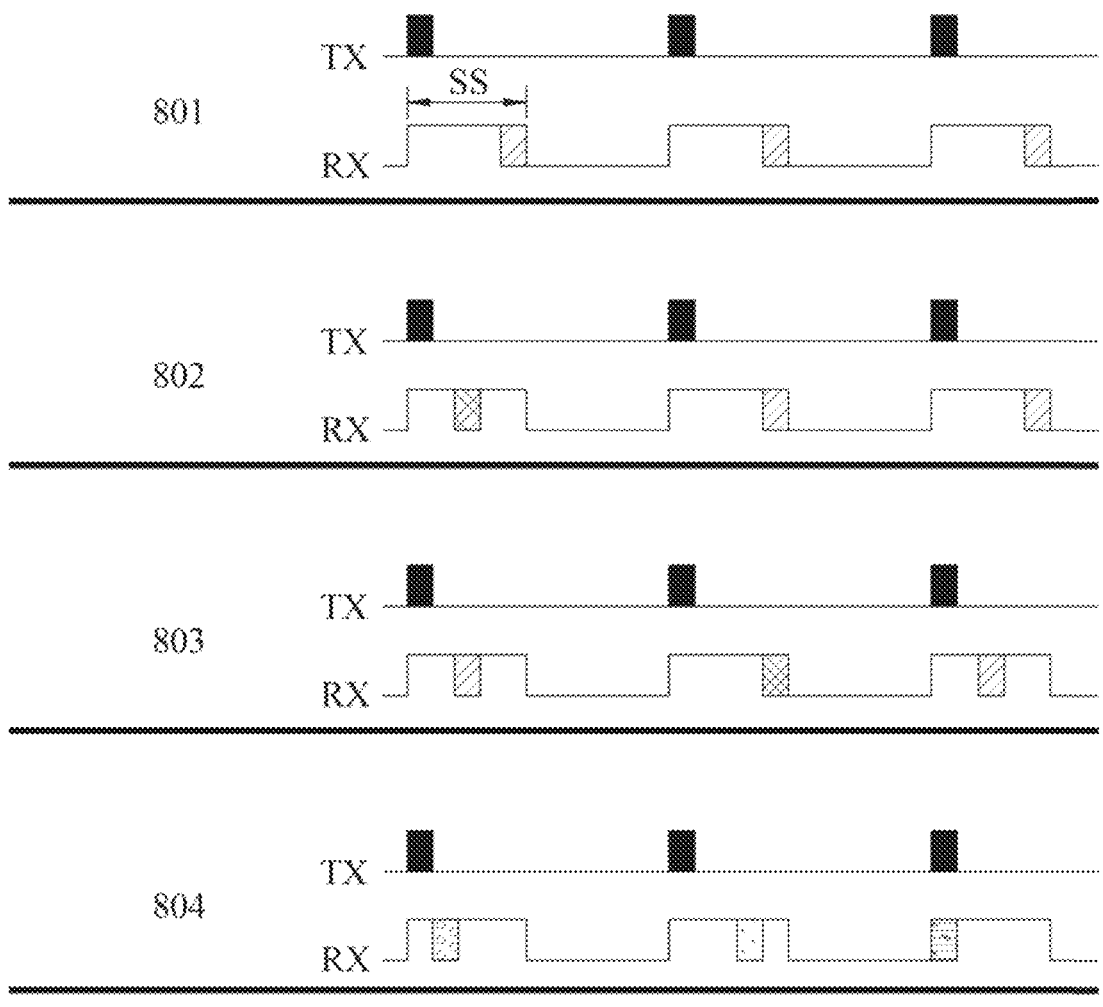
FIG. 8 is an exemplified timing diagram of the present invention in different situations.

To eliminate the crosstalk received when the receiver (RX) is turned on, in an environmental image including a plurality of sampling areas, the MCU 101 may compare the signal-receiving patterns between adjacent subframes at identical sampling areas to eliminate abnormal values. Referring to FIG. 8, in an embodiment, each frame includes three subframes, each subframe obtains an image in the cycle time T and includes a plurality of sampling areas, in which the first subframe is obtained through the calculation of the MCU performed to a first reflective light signal received by the receiver (RX) within a first sensor shutter time, the second subframe is obtained through the calculation of the MCU performed to a second reflective light signal received by the receiver (RX) within a second sensor shutter time, and the third subframe is obtained through the calculation of the MCU performed to a third reflective light signal received by the receiver (RX) within a third sensor shutter time. Each sampling area includes a plurality of pixels, and a distance value of each reflective light signal at each pixel may be obtained according to a time of flight (ToF). The MCU takes an average distance value of the distance values of the plurality of pixels to represent the average distance value of the sampling area. In an environmental image including a plurality of sampling areas, the MCU compares the average distance values of each subframe of the frame in a plurality of sampling areas at identical positions. In situation 801, in a plurality of sampling areas of an identical position, the average distance values received by the receiver (RX) in three subframes are similar, indicating that the three reflective light signals are from similar distances. Thus, the situation 801 may be regarded as a normal situation, in which the MCU 101 fuses the distances representing the reflective light signals in the three subframes and calculates a final distance value of the frame. Here, the fusing may be performed by averaging, superposition, selection, or other methods. In situation 802, in a plurality of sampling areas of an identical position, the average distance values of the reflective light signals of the first subframe and the second subframe are different, indicating that crosstalk is received in at least one of the first subframe and the second subframe. In this case, compare the third subframe with the second subframe. If the average distance value of the third subframe is similar to that of the second subframe, a judgment that the second subframe and the third subframe are normal and the first subframe is abnormal may be made. As shown in FIG. 8, in situation 802, the second subframe and the third subframe are normal while the first subframe is abnormal. In this case, situation 802 may still be regarded as a normal situation, yet only the reflective light signals of the second subframe and the third subframe are adopted to calculate the final distance value, and the reflective light signal of the first subframe is eliminated. In situation 803, the average distance values of the reflective light signals of the first subframe and the second subframe are different, and the average distance values of the reflective light signals of the second subframe and the third subframe are different as well. In this case, in spite of the similarity of the average distances of the reflective light signals of the first subframe and the third subframe, due to the lack of similar signals in two consecutive subframes, it is unable to confirm which signal(s) are normal and which are abnormal. Thus, situation 803 is regarded as an abnormal situation, and the frame is eliminated. In situation 804, all the average distance values of the reflective light signals of the three subframes are different. In this case, due to the inability to confirm which signal(s) are normal and which are abnormal, the situation 804 is regarded as an abnormal situation, and the frame is eliminated. Such a method uses relatively few subframes and has relatively low resolution (due to using only two subframes to fuse), and the comparison is faster, suitable for fast dynamic detection situations, such as the front and rear detection during vehicle movement.

Figure 9:
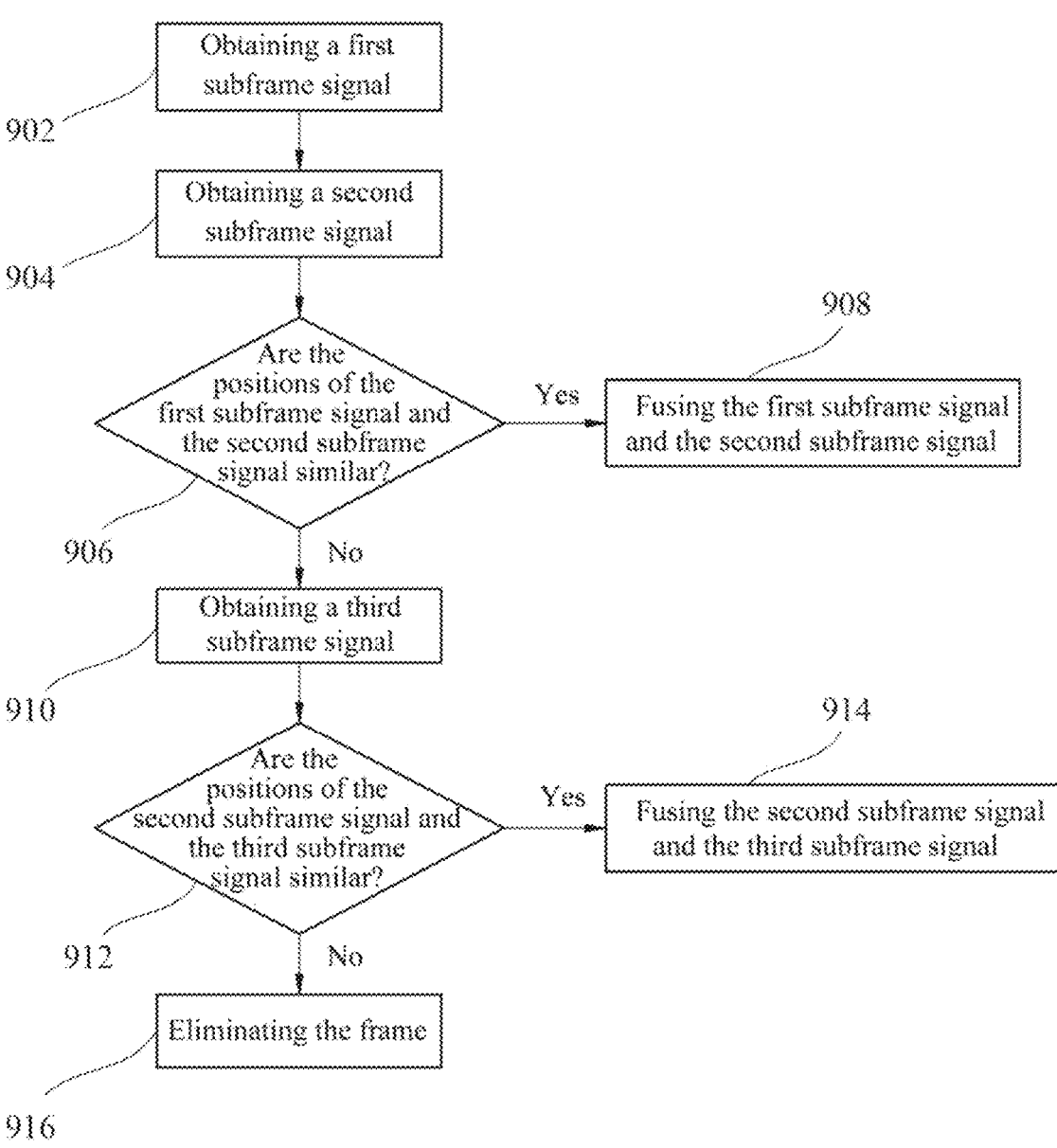
FIG. 9 is a flow chart of a crosstalk reduction method according to the present invention.

Referring to FIG. 9, in an embodiment, a method 900 is applied to implement the judgment flow for the different situations shown in FIG. 8. In step 902, the receiver obtains the reflective light signal of the first subframe. In step 904, the receiver obtains the reflective light signal of the second subframe. In step 906, the MCU determines whether the average distance values of the reflective light signals of the first subframe and the second subframe in a plurality of sampling areas at identical positions are similar. If so, in step 908, the MCU fuses the distance values representing the reflective light signals of the first subframe and the second subframe as the final distance value of the frame, and the flow ends. Here, the fusing may be performed by averaging, superposition, selection, or other methods. If not, in step 910, the receiver obtains the reflective light signal of the third subframe. In step 912, the MCU determines whether the average distance values of the reflective light signals of the second subframe and the third subframe in a plurality of sampling areas at identical positions are similar. If so, in step 914, the MCU fuses the distance values representing the reflective light signals of the second subframe and the third subframe as the final distance value of the frame, and the flow ends. If not, in step 916, the signals of the frame are eliminated, and the flow ends.

Figure 10A:
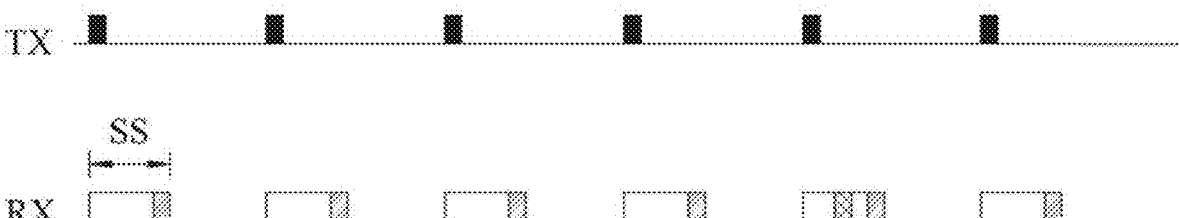
FIG. 10A is another exemplified timing diagram of the present invention.

Referring to FIG. 10A, in an embodiment, a plurality of subframes (preferably at least six) may be applied in a frame to distinguish normal signals from abnormal signals more precisely. In the example shown in FIG. 10A, in an environmental image including a plurality of sampling areas, in an identical sampling area, the position of the reflective light signal of the fifth subframe in the sensor shutter time SS is different from the remaining subframes (that is, the time of flight is different), thus the average distance value of the fifth subframe is different from the remaining subframes. In this case, the MCU eliminates the fifth subframe and fuses the average distance values of the remaining subframes as the final distance value of the frame. Due to the movement of the object, in each sampling area, the signals entering the sensor at each subframe may not appear at the same pixels. Thus, in the present embodiment, the fusing may include superposing all the signals appearing at different pixels of the uneliminated subframes in the same sampling area and obtaining the average value of all the pixels after superposition. For example, in an embodiment, Tables 1A to 1F below represent an identical sampling area at the first subframe to the sixth subframe of a frame respectively, in which a small box represents a pixel, the numbers in the boxes represent the sub-distance values obtained at the pixels of the subframe, and the unnumbered boxes represent the pixels without sub-distance values. For each subframe, obtain an average distance value of the pixels with sub-distance values, and eliminate the abnormal subframes according to the average distance values of each subframe. It can be understood from Tables 1A to 1F that the average distance value of the sixth subframe is significantly distinct from the remaining subframes, thus the sixth subframe is regarded as an abnormal subframe and eliminated. Subsequently, as shown in Table 1G, superpose each pixel of the normal subframes (the first subframe to the fifth subframe, corresponding to Tables 1A to 1E) and obtain an average value of the pixels with sub-distance values after superposition as the final distance value of the sampling area at the frame. When superposing, if there are a plurality of sub-distance values at a pixel, take the average value or select the maximum value. If the pixel has no sub-distance value, select the minimum value within the detection range (for example, 0). Alternatively, if there are a plurality of sub-distance values at a pixel, take the average value or select the minimum value. If the pixel has no sub-distance value, select the maximum value within the detection range (for example, 500 or 1000). Such a method uses relatively many subframes and has relatively high resolution (due to using a plurality of subframes to fuse), suitable for situations other than fast dynamic detection.

TABLE 1A

| (first subframe, average 150.32) | | | |
|---|---|---|---|
| 150.2 | | | 150.3 |
| | 150.4 | | |
| | | | 150.4 |
| 150.2 | | | |
| | | 150.4 | |

TABLE 1B

| (second subframe, average 150.26) | | | |
|---|---|---|---|
| 150.3 | | | 150.2 |
| | | 150.3 | |
| 150.3 | | | |
| | | 150.2 | |

TABLE 1C

| (third subframe, average 150.27) | | | |
|---|---|---|---|
| 150.1 | | 150.3 | |
| | 150.2 | | |
| | | | 150.4 |
| 150.2 | | | |
| | | 150.4 | |

TABLE 1D

| (fourth subframe, average 150.30) | | | |
|---|---|---|---|
| 150.2 | | | |
| | | | 150.3 |
| | 150.3 | 150.4 | |
| 150.2 | | | |
| | | 150.4 | |

9

TABLE 1E (fifth subframe, average 150.28)

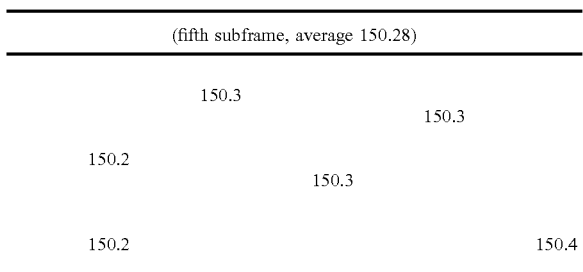

TABLE 1F (sixth subframe, average 45.55)

| 45.6 | | | 45.5 | | | |
|---|---|---|---|---|---|---|
| | | 45.6 | | | 45.6 | |
| | 45.6 | | | | | |
| | | | 45.6 | | 45.5 | |
| | | 45.6 | | | | |
| | | | | 45.5 | | |
| | 45.5 | | | | | |
| | | 45.5 | | | | |
| | | | | 45.6 | | |

TABLE 1G (after eliminating the sixth subframe, superposing all the pixels of the first to fifth subframes)

| 0 | 150.2 | 0 | 0 | 0 | 0 | 0 | 0 | 150.3 | 150.2 |
|---|---|---|---|---|---|---|---|---|---|
| 0 | 150.2 | 150.3 | 150.3 | 0 | 0 | 0 | 150.3 | 0 | 150.3 |
| 0 | 0 | 0 | 0 | 0 | 0 | 0 | 150.3 | 0 | 0 |
| 0 | 0 | 150.3 | 0 | 150.4 | 0 | 150.4 | 0 | 0 | 0 |
| 0 | 150.2 | 0 | 0 | 0 | 0 | 0 | 150.4 | 0 | |
| 0 | 0 | 0 | 150.3 | 0 | 150.3 | 0 | 0 | 0 | 150.4 |
| 0 | 0 | 150.2 | 0 | 0 | 0 | 0 | 0 | 0 | 0 |
| 0 | 150.2 | 150.2 | 0 | 0 | 0 | 150.4 | 150.2 | 0 | 0 |
| 0 | 150.2 | 0 | 0 | 0 | 150.4 | 150.4 | 0 | 150.4 | |
| 0 | 0 | 0 | 0 | 0 | 0 | 0 | 0 | 0 | 0 |

Referring to FIG. 10B, a method 1000 is applied to implement the judgment flow of the situation shown in FIG. 10A. In step 1002, the MCU samples a plurality of sampling areas in an environmental image, each sampling area including a plurality of pixels. The number of pixels included in the sampling areas is no more than 10% of the number of pixels of the environmental image, and the number of the sampling area is at least five. In step 1004, for an identical sampling area, obtain a reflective light signal in each sensor shutter time of a plurality of subframes of a frame, and calculate a distance value of each pixel in the sampling area according to a time of flight of the reflective light signal. In step 1006, calculate an average value of the distance values of all the pixels in the sampling area to represent the average distance value of the sampling area. In step 1008, in the subframes of the plurality of sampling areas at identical positions, the MCU eliminates the subframes with significantly distinct average distance values (also known as abnormal subframes). In step 1010, the MCU fuses the distance value of the pixels in the environmental image of the uneliminated subframes (also known as normal subframes) as a final distance value of the frame.

Figure 11B:
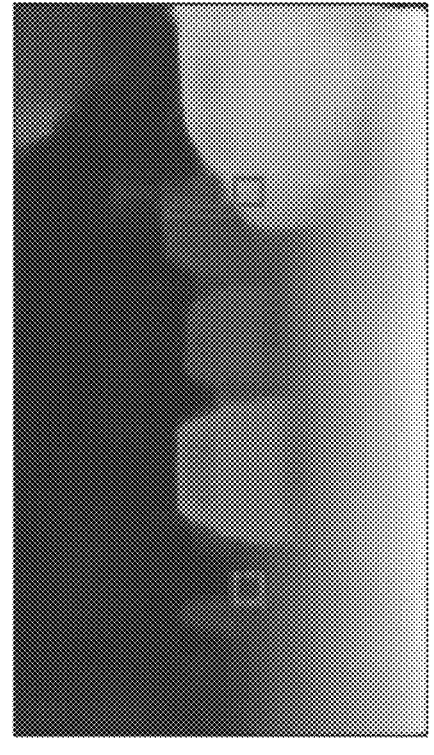
FIGS. 11B, 11C and 11D are sampling examples of FIG. 11A.
Figure 11D:
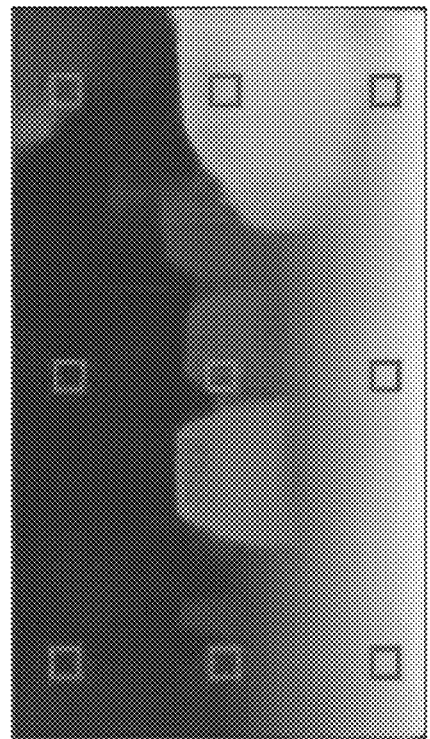
Figure 11A:
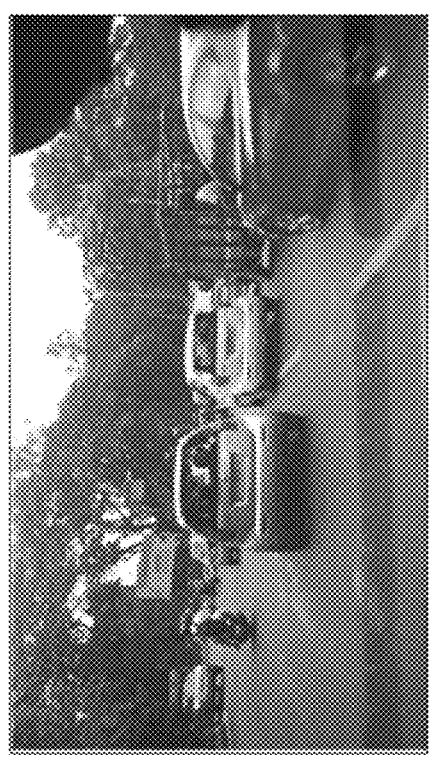
FIG. 11A is a real environmental image.
Figure 11A:

FIG. 11A is a real environmental image. To increase calculating efficiency, it is desirable to sample a plurality of areas to measure instead of measuring the distances of every

Figure 11C:
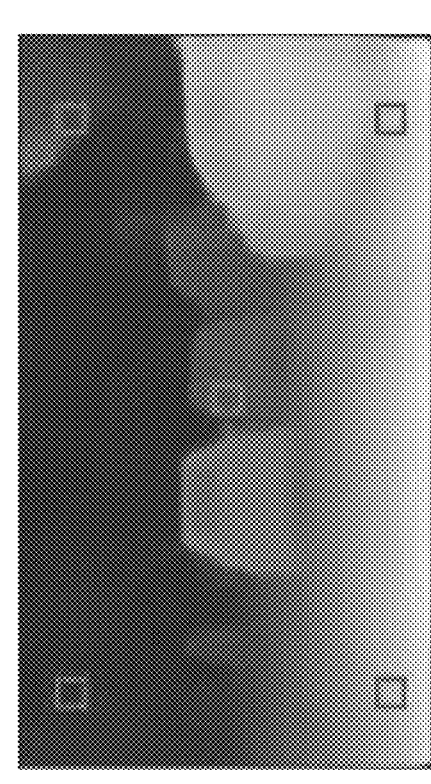
Figure 12A:
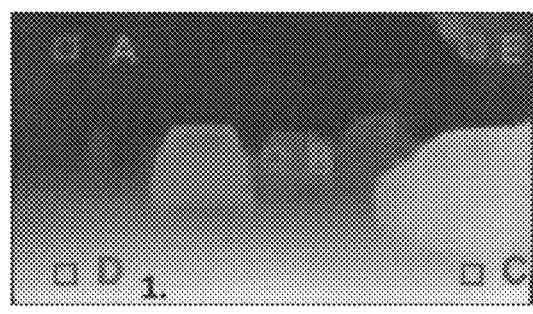
FIGS. 12A, 12B, 12C, 12D, 12E and 12F are sampling patterns of different subframes within a frame.
Figure 12B:
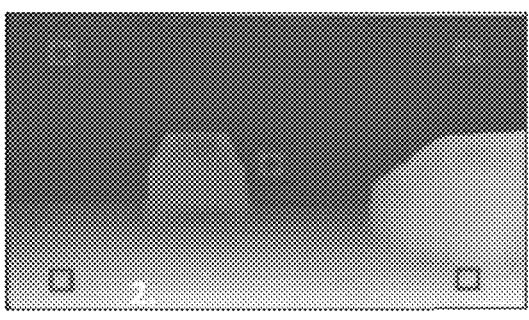
Figure 12C:
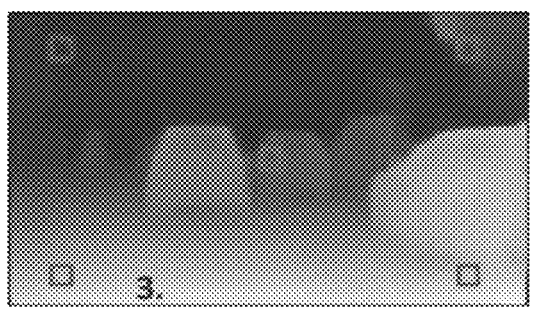
Figure 12D:
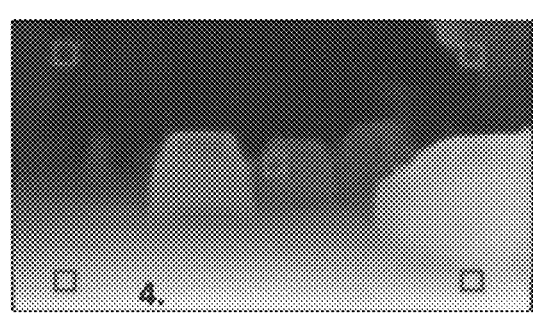
Figure 12E:
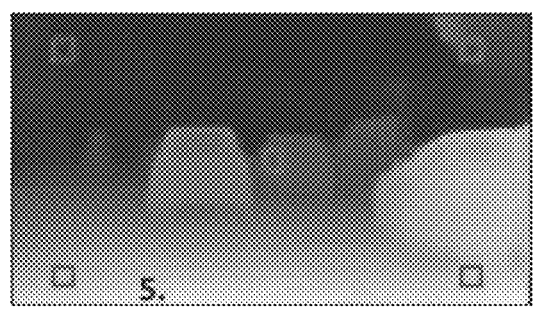
Figure 12F:
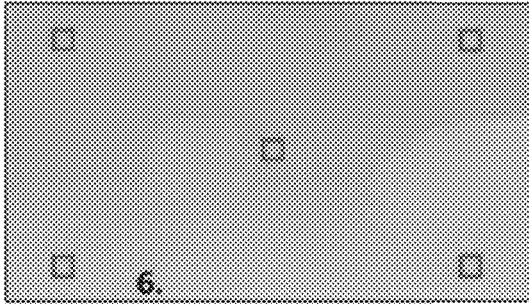

10 pixel on the image. Each sampling area includes a plurality of pixels, for example, 10×10 pixels. It is desirable not to sample too many pixels, for example, no more than 10% of the total number of pixels, to increase calculating efficiency. FIG. 11B shows an embodiment of sampling two areas. FIG. 11C shows an embodiment of sampling five areas. FIG. 11D shows an embodiment of sampling nine areas. The number of sampling areas is preferably no less than five to grasp the environmental information effectively. In a normal subframe, the number of sampling areas with normal distance values is greater than a specific proportion of the total number of sampling areas (for example, 80% or 88.9%, where 80% indicates tolerating a sampling area having an abnormal distance value when sampling five areas, and 88.9% indicates tolerating a sampling area having an abnormal distance value when sampling nine areas). Otherwise, the subframe is regarded as an abnormal subframe. The MCU fuses the distance values of the pixels in the environmental image of the plurality of subframes as a final distance value of the frame.

Referring to FIGS. 12A to 12F, in an embodiment of a frame including six subframes, the six subframes are sequentially FIG. 12A, FIG. 12B, FIG. 12C, FIG. 12D, FIG. 12E and FIG. 12F, in which the second subframe (FIG. 12B) and the sixth subframe (FIG. 12F) suffer from the invasion of crosstalk. To effectively eliminate interfered subframes, the distance values measured at the pixels within each sampling area of each subframe may be fused as a sub-distance value of the sampling area at the subframe, and then compare the six sub-distance values of the same sampling area at the six subframes to eliminate abnormal values. In an embodiment, a method of eliminating abnormal values is calculating the average ($\mu$), standard deviation ($\sigma$), upper threshold value and lower threshold value of the six sub-distance values of the same sampling area at the six subframes, in which the upper threshold value is the average plus a number of standard deviations ($\mu+n\sigma$) and the lower threshold value is the average minus a number of standard deviations ($\mu-n\sigma$), where the value of n is determined according to experimental data and practical needs, and may be an integer or non-integer, such as (but not limited to) 1 or 1.5. In the embodiments shown in Tables 2, 3 and 4 below, the description is taken place with the example of n=1, but the present invention is not limited thereto. Subsequently, eliminate the subframes with sub-distance values greater than the upper threshold value or smaller than the lower threshold value, and fuse the remaining subframes with similar sub-distance values as the final distance value of the frame.

Tables 2, 3 and 4 show possible sensing results. In the example shown in Table 2, at the first subframe, there are no obstacles in front of the sampling area A. Here, the distance of the sampling area A is regarded as the longest distance (for example, 500 m). At the second subframe, there is crosstalk invading the sampling area A. At the sixth frame, sampling areas A, B, C, D and E all suffer from crosstalk invasion. In this case, as shown in Table 2, the distance values of the sampling area A at the second subframe and the sixth subframe are smaller than the lower threshold value, and thus shall be regarded as abnormal values and eliminated. The distance values of the sampling areas B, C, D and E at the sixth subframe are smaller than respective lower threshold values, and thus shall be regarded as abnormal values and eliminated.

TABLE 2

| Area | Subframe | | | | | | Standard deviation | Average | Upper threshold | Lower threshold | Abnormal subframes |
|---|---|---|---|---|---|---|---|---|---|---|---|
| | 1 | 2 | 3 | 4 | 5 | 6 | | | | | |
| A | 500 | 150 | 500 | 500 | 500 | 49 | 191.04 | 366.50 | 557.54 | 175.46 | 2, 6 |
| B | 150 | 150 | 150 | 150 | 150 | 49 | 37.64 | 133.17 | 170.81 | 95.53 | 6 |
| C | 50 | 50 | 50 | 50 | 50 | 49 | 0.37 | 49.83 | 50.21 | 49.46 | 6 |
| D | 50 | 50 | 50 | 50 | 50 | 49 | 0.37 | 49.83 | 50.21 | 49.46 | 6 |
| E | 180 | 150 | 180 | 180 | 180 | 49 | 47.86 | 153.17 | 201.02 | 105.31 | 6 |

In the example shown in Table 3, at the fourth subframe, the sampling area A suffers from crosstalk invasion, and the measured distance value is close to the normal value. At the sixth subframe, sampling areas A, B, C, D and E all suffer from crosstalk invasion. In this case, as shown in Table 3, the distance value of the sampling area A is greater than the upper threshold value at the fourth subframe and smaller than the lower threshold value at the sixth subframe, and thus shall be regarded as abnormal values and eliminated. The distance values of the sampling areas B, C, D and E at the sixth subframe are smaller than respective lower threshold values, and thus shall be regarded as abnormal values and eliminated. As such, although the measured distances of the sampling area A at the fourth subframe and the sixth subframe are close to the normal values, the two subframes may be correctly recognized as abnormal and eliminated.

TABLE 3

| Area | Subframe | | | | | | Standard deviation | Average | Upper threshold | Lower threshold | Abnormal subframes |
|---|---|---|---|---|---|---|---|---|---|---|---|
| | 1 | 2 | 3 | 4 | 5 | 6 | | | | | |
| A | 9.8 | 9.8 | 9.9 | 10 | 9.9 | 9.5 | 0.16 | 9.82 | 9.97 | 9.66 | 4, 6 |
| B | 150 | 150 | 150 | 150 | 150 | 8 | 52.92 | 126.33 | 179.25 | 73.41 | 6 |
| C | 50 | 50 | 50 | 50 | 50 | 8 | 15.65 | 43.00 | 58.65 | 27.35 | 6 |
| D | 50 | 50 | 50 | 50 | 50 | 8 | 15.65 | 43.00 | 58.65 | 27.35 | 6 |
| E | 180 | 150 | 180 | 180 | 180 | 8 | 62.83 | 146.33 | 209.16 | 83.51 | 6 |

In the example shown in Table 4, at the sixth subframe, sampling areas B, C, D and E suffer from crosstalk invasion. In this case, as shown in Table 4, the distance values of the sampling areas B, C, D and E at the sixth subframe are smaller than respective lower threshold values, and thus shall be regarded as abnormal values and eliminated.

TABLE 4

| Area | Subframe | | | | | | Standard deviation | Average | Upper threshold | Lower threshold | Abnormal subframes |
|---|---|---|---|---|---|---|---|---|---|---|---|
| | 1 | 2 | 3 | 4 | 5 | 6 | | | | | |
| A | 9.8 | 9.9 | 9.9 | 9.9 | 9.9 | 9.8 | 0.05 | 9.87 | 9.91 | 9.82 | None |
| B | 150 | 150 | 150 | 150 | 150 | 13 | 51.06 | 127.17 | 178.22 | 76.11 | 6 |
| C | 50 | 50 | 50 | 50 | 50 | 13 | 13.79 | 43.83 | 57.62 | 30.04 | 6 |
| D | 50 | 50 | 50 | 50 | 50 | 13 | 13.79 | 43.83 | 57.62 | 30.04 | 6 |
| E | 180 | 150 | 180 | 180 | 180 | 13 | 60.99 | 147.17 | 208.16 | 86.17 | 6 |

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A LiDAR system, comprising:
a microcontroller;
a laser light source, coupled to the microcontroller;
a lens module; and
a receiver, coupled to the microcontroller,
wherein:
the lens module includes a laser beam splitter module and a receiver lens module, the laser beam splitter module receiving a laser light emitted from the laser light source and diffracting the laser light into a plurality of diffractive lights, the diffractive lights being emitted towards a target;
the receiver lens module receives a reflective light signal of the diffractive lights reflected from the target, and emits the reflective light signal towards the receiver;
the laser light source emits a pulse signal with a cycle time;
the microcontroller controls the receiver to turn on during a sensor shutter time and turn off during a reset time in each cycle time;
a frame of the LiDAR system includes a plurality of subframes, each subframe obtaining images within each cycle time respectively;
in an environmental image including a plurality of sampling areas of each subframe, each sampling area includes a plurality of pixels, a distance value of each reflective light signal at each pixel being obtained according to a time of flight;

the microcontroller calculates an average distance value of the distance values of the plurality of pixels, which represents the average distance value of the sampling area; and the microcontroller compares the average distance values at the same sampling area of each subframe within the frame, eliminates the subframes with abnormal average distance values, and fuses the other subframes with similar average distance values as a final distance value of the frame.

2. The LiDAR system according to claim 1, wherein the receiver lens module includes a lens module with an adjustable focal length including at least one concave lens and at least one convex lens, which modulates a size of field of view according to a detection range.

3. The LiDAR system according to claim 1, wherein the receiver lens module includes a plurality of lens modules with fixed focal lengths, each lens module including at least one concave lens and at least one convex lens, the lens modules being switched according to a detection range to modulate a size of field of view.

4. The LiDAR system according to claim 1, wherein the laser beam splitter module includes a diffractive optical element and a plurality of collimation lens assemblies with fixed focal lengths, the collimation lens assemblies being switched according to a detection range to modulate a range of field of image.

5. The LiDAR system according to claim 1, wherein the laser beam splitter module includes a diffractive optical element and a collimation lens assembly with an adjustable focal length, the collimation lens assembly being switched according to a detection range to modulate a range of field of image.

6. The LiDAR system according to claim 4, wherein the diffractive optical element diffracts the laser light into the diffractive lights, the collimation lens assembly is placed at a front of the diffractive optical element, and a mirror surface of the collimation lens assembly is perpendicular to an incident direction of the laser light to converge the diffractive lights to be substantially parallel to each other.

7. The LiDAR system according to claim 5, wherein the diffractive optical element diffracts the laser light into the diffractive lights, the collimation lens assembly is placed at a front of the diffractive optical element, and a mirror surface of the collimation lens assembly is perpendicular to an incident direction of the laser light to converge the diffractive lights to be substantially parallel to each other.

8. The LiDAR system according to claim 4, further including a concave mirror, the diffractive optical element diffracts the laser light into the diffractive lights, the concave mirror collects the diffractive lights, and the collimation lens assembly is placed at a front of the concave mirror to converge the diffractive lights to be substantially parallel to each other.

9. The LiDAR system according to claim 5, further including a concave mirror, the diffractive optical element diffracts the laser light into the diffractive lights, the concave mirror collects the diffractive lights, and the collimation lens assembly is placed at a front of the concave mirror to converge the diffractive lights to be substantially parallel to each other.

10. The LiDAR system according to claim 1, wherein the sensor shutter time and the reset time are determined according to a detection range.

11. The LiDAR system according to claim 10, further includes a start time and an end time, the microcontroller controls the receiver to turn on between the start time and the end time within each cycle time, and to turn off during the remaining time;

the start time is determined according to a lower limit of the detection range; and the end time is determined according to an upper limit of the detection range.

12. A LiDAR system, comprising:

a microcontroller;

a laser light source, coupled to the microcontroller;

a lens module, and a receiver, coupled to the microcontroller, wherein:

the lens module includes a laser beam splitter module and a receiver lens module, the laser beam splitter module receiving a laser light emitted from the laser light source and diffracting the laser light into a plurality of diffractive lights, the diffractive lights being emitted towards a target;

the receiver lens module receives a reflective light signal of the diffractive lights reflected from the target, and emits the reflective light signal towards the receiver;

the laser light source emits a pulse signal with a cycle time;

the microcontroller controls the receiver to turn on during a sensor shutter time and turn off during a reset time in each cycle time;

a frame of the LiDAR system includes a first subframe, a second subframe and a third subframe, the first subframe, the second subframe and the third subframe include a plurality of sampling areas, respectively;

the first subframe is obtained through the microcontroller by calculating a first reflective light signal received by the receiver during a first sensor shutter time;

the second subframe is obtained through the microcontroller by calculating a second reflective light signal received by the receiver during a second sensor shutter time;

the third subframe is obtained through the microcontroller by calculating a third reflective light signal received by the receiver during a third sensor shutter time;

in an environmental image including a plurality of sampling areas, the controller compares average distance values in the plurality of sampling areas at identical positions of each subframe in the frame, and compares whether the average distance value of the first reflective light signal and the average distance value of the second reflective light signal are similar;

if the average distances of the first reflective signal and the second reflective signal in the sampling areas at the identical positions are similar, the microcontroller fuses a first distance value which the first reflective light signal represents and a second distance value which the second reflective light signal represents as a final distance value of the frame;

if the average distances of the first reflective signal and the second reflective signal in the sampling areas at the identical positions are different, and average distances of the second reflective signal and the third reflective signal in the sampling areas at the identical positions are similar, the microcontroller fuses the second distance value which the second reflective light signal represents and a third distance value which the third reflective light signal represents as the final distance value of the frame; or if the average distances of the first reflective signal and the second reflective signal in the sampling areas at the identical positions are different, and if the average distances of the second reflective signal and the third reflective signal in the sampling areas at the identical positions are different, the frame is eliminated.

13. A crosstalk reduction method of the LiDAR system according to claim 1, the method comprising:

sampling a plurality of sampling areas in an environmental image, each sampling area including a plurality of pixels, wherein the number of pixels included in the sampling areas is not more than 10% of the number of pixels of the environmental image, and the number of the sampling areas is at least five;

for a same sampling area, in each sensor shutter time of a plurality of subframes of a frame, obtaining a reflective light signal, and calculating a distance value for each pixel within the sampling area according to the time of flight of the reflective light signal;

calculating an average value of all the distance values of the pixels within the sampling area, the average value representing an average distance value of the sampling area;

among the subframes, eliminating the subframes having significantly distinct average distance values at identical positions of the plurality of sampling areas; and fusing the distance values in the environmental images of the uneliminated subframes as the final distance value of the frame.

14. The crosstalk reduction method according to claim 13, further comprising:

for one of the sampling areas, in each subframe of the frame, fusing the distance values obtained at each pixel of the sampling area as a sub-distance value of the sampling area of the subframe;

calculating an average, a standard deviation, an upper threshold value and a lower threshold value of the sub-distance values of the subframes, the upper threshold value being the average plus a number of the standard deviation, the lower threshold value being the average minus a number of the standard deviation; and eliminating the subframes having sub-distance values greater than the upper threshold value or smaller than the lower threshold value and fusing the other subframes with similar sub-distance values as the final distance value of the frame.

* * * * *